United States Patent [19]

Miller et al.

[11] Patent Number: 6,036,740

[45] Date of Patent: *Mar. 14, 2000

[54] CONCENTRATED GYPSUM SLURRIES FOR USE IN DRIP IRRIGATION

[76] Inventors: John C. Miller; Deborah L. Miller, both of 32 Deer Point Dr., Hawthorn Woods, Ill. 60047

[*] Notice: This patent issued on a continued prosecution application filed under 37 CFR 1.53(d), and is subject to the twenty year patent term provisions of 35 U.S.C. 154(a)(2).

[21] Appl. No.: 09/020,809

[22] Filed: Feb. 9, 1998

[51] Int. Cl.[7] ............... C05B 9/00; C05D 1/00; C01B 17/00; C02F 1/00

[52] U.S. Cl. ............ 71/32; 71/33; 71/63; 71/603; 423/269; 47/79; 47/48.5; 47/DIG. 10; 252/175; 210/700

[58] Field of Search ............... 71/32, 23, 63, 71/603; 423/269; 47/79, DIG. 10, 48.5; 252/175; 210/700

[56] References Cited

U.S. PATENT DOCUMENTS

| | | | |
|---|---|---|---|
| 3,434,969 | 3/1969 | Ralston | 210/58 |
| 3,804,770 | 4/1974 | Lorenc et al. | |
| 4,105,581 | 8/1978 | Sexsmith | 252/389 |
| 4,678,840 | 7/1987 | Fong et al. | |
| 4,744,949 | 5/1988 | Hoots et al. | |
| 4,812,045 | 3/1989 | Rivers | 366/107 |
| 4,818,506 | 4/1989 | Lin et al. | 423/242 |
| 4,820,053 | 4/1989 | Rivers | |
| 4,931,189 | 6/1990 | Dhawan et al. | 210/700 |
| 5,047,078 | 9/1991 | Gill | 71/11 |
| 5,765,945 | 6/1998 | Palmer | 366/167.1 |

OTHER PUBLICATIONS

Terekhin et al., "Method for complex kinetic evaluation of the effect of active microadditives on crystallization from water–salt systems", Vysokochist, pp. 20–27, 1989.

Samakaev et al., "Effects of additives of 2,3–dihydroxy–1, 4–diaminobutane–N,N,N',N'–tetramethylenephosphonic acid on the stability of supersaturated calcium sulfate solutions", Zh. Neorg. Khim., pp. 2146–2148, 1984.

*The Ag. Solution Master,* Soil Solution Corp., Oct. 1991.

*Ag Pro,* Western Gypsum, (Date unknown).

*Primary Examiner*—Gary P. Straub
*Attorney, Agent, or Firm*—John G. Premo

[57] ABSTRACT

Concentrated aqueous gypsum slurries containing small amounts of water soluble phosphonates are non-clogging when used in drip irrigation systems.

7 Claims, No Drawings

CONCENTRATED GYPSUM SLURRIES FOR USE IN DRIP IRRIGATION

FIELD OF THE INVENTION

The stabilization of concentrated gypsum slurries used to treat micro and drip irrigation systems.

BACKGROUND OF THE INVENTION

Agriculture has developed the practice of injecting fertilizers and soil amendments directly into irrigation water to quickly condition soil. Gypsum is a naturally-occurring mineral which provides enhanced water penetration of certain soils. Although it has been in use for over two hundred years, it is only in the last several years that the many benefits for the use of gypsum have been touted. These benefits include:

Improves soil structure
Reclaims sodic soils
Prevents soil crusting and aids in seedling emergence
Improves compacted soils
Helps plants absorb nutrients
Stops water run-off and erosion
Corrects subsoil acidity as well as many others.

Until recent years, most of the gypsum used in agriculture was field spread, typically using the low-grade form found in abundance in the western United States. However, this method of application dramatically limited the benefits that gypsum provided. This is especially true in clay soils, where the gypsum would not easily penetrate when spread on the surface.

Realizing the potential that gypsum offers, different producers attempted to introduce a gypsum solution directly to irrigation water, but the low purity and coarse grind of commonly available gypsum limited the beneficial results with gypsum applied in this manner. Secondary problems, such as plugging, excessive filter backflushing, and gypsum loss, limited the success of this approach, especially in micro and drip irrigation.

The current marketers of gypsum have taken two major approaches to produce a gypsum solution which could be directly injected into irrigation water. One approach was to mine a very high grade ore of gypsum, and grind it ultra-fine, to facilitate the dissolution of this relatively insoluble mineral. The second approach, often used in tandem with the first, was to develop specialized equipment which efficiently dissolved and injected the gypsum. Both of these approaches have been effective to a degree. As a result, the amounts of gypsum sold for direct injection into irrigation water has risen.

However, the prior art has been limited by the practical applications in the field, primarily due to water quality. The prior art, a combination of the use of ultra-fine, high quality grades of gypsum with specialized solubilization equipment, in combination with pure water, leads to a gypsum delivery system that produces no clogging or plugging of the irrigation system. In reality, natural waters are often not pure. They have many impurities of many different types. Interaction of the gypsum and impurities found in naturally-occurring waters results in precipitates that cause deposits. These deposits result in plugging and loss of distribution efficiencies within the irrigation systems. As a result, the problem-free use of gypsum has been restricted to relatively pure water systems.

OBJECTS OF THE INVENTION

It is an object of the invention to provide stable non-plugging concentrated gypsum slurries used in drip irrigation systems even though they are prepared using impure, naturally-occurring waters. The term, "drip irrigation" as used herein and in the claims includes microsprinklers, drip and subsurface drip systems. It is another object of the invention to provide these concentrated, stable gypsum slurries at a low cost by using small yet effective amounts of a water soluble stabilizing agent.

A further object of the invention is to provide ultra-fine, concentrated gypsum slurries in which the suspended gypsum is maintained in an ultra-fine stable state for prolonged periods of time.

Other objects will appear hereafter.

THE INVENTION

The invention in its broadest aspects comprises a concentrated aqueous gypsum slurry used to provide calcium sulfate to the soil through micro and drip irrigation water systems. These slurries are stabilized to prevent clogging of drip irrigation systems. These slurries comprise a concentrated aqueous slurry of finely divided gypsum having an average particle smaller than 100 mesh and a stabilizing amount of a water-soluble phosphonate based on the amount of soluble gypsum present in the irrigation water. The term "concentrated", when used to refer to the concentration of the gypsum in the aqueous slurries, is meant to include slurries having a gypsum concentration of at least 0.01 lbs./gallon. Typically, these slurries contain from between 2 to 4 lbs. of gypsum/gal. or more.

In a preferred embodiment the water soluble phosphonate is an aliphatic phosphonate which contains from 1–12 carbon atoms and from 1–3 phosphonate groups. The phosphonates may be selected from a large group of compounds which are generically described below as Formulas 1–3.

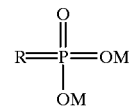

(1)

Where R is lower alkyl having from about one to six carbon atoms, e.g., methyl, ethyl, butyl, propyl, isopropyl, pentyl, isopentyl and hexyl; substituted lower alkyl of from one to six carbon atoms, e.g., hydroxyl, COOM and amino-substituted alkyls; a mononuclear aromatic (aryl) radical, e.g., phenyl, benzene, etc., or a substituted mononuclear aromatic compound, e.g., hydroxyl, amino, lower alkyl substituted aromatic, e.g., benzyl phosphonic acid; and M is a water-soluble cation, e.g., sodium, potassium, ammonium, lithium, etc. or hydrogen.

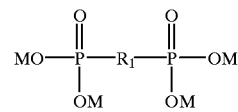

(2)

Where $R_1$ is an alkylene having from about 1 to about 12 carbon atoms or a substituted alkylene having from about 1 to about 12 carbon atoms, e.g., hydroxyl, amino etc. substituted alkylenes, and M is as earlier defined above.

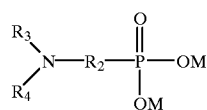

Where $R_2$ is a lower alkylene having from about one to about four carbon atoms, or an amine or hydroxy substituted lower alkylene; $R_3$ is $[R_2\text{—}PO_3M_2]$ H, OH, amino, substituted amino, an alkyl having from one to six carbon atoms, a substituted alkyl of from one to six carbon atoms (e.g., OH, $NH_2$ substituted) a mononuclear aromatic radical and a substituted mononuclear aromatic radical (e.g., OH, $NH_2$ substituted); $R_4$ is $R_3$ or the group represented by the formula.

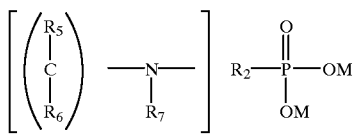

Where $R_5$ and $R_6$ are each hydrogen, lower alkyl of from about one to six carbon atoms, a substituted lower alkyl (e.g., OH, $NH_2$ substituted), hydrogen, hydroxyl, amino group, substituted amino group, a mononuclear aromatic radical, and a substituted mononuclear aromatic radical (e.g., OH and amine substituted); $R_7$ is H, or lower alkyl e.g. about one to six carbon atoms, R is $R_5$, $R_6$ or the group $R_2\text{—}PO_3M_2$ ($R_2$ is as defined above); n is a number of from 1 through about 15; y is a number of from about 1 through about 14; and M is as earlier defined.

Specific examples of compounds which are encompassed by Formula 1 include: methylphosphonic acid, ethylphosphonic acid, 2-hydroxyethylphosphonic acid, 2-aminoethylphosphonic acid, isopropylphosphonic acid, benzene phosphonic acid, benzylphosphonic acid, and 2-phosphonobutane-1,2,4-tricarboxilic acid.

Specific exemplary compounds and their respective formulas which are encompassed by Formula 2 are as follows: methylene diphosphonic acid, ethylidene diphosphonic acid, isopropylidene diphosphonic acid, 1-hydroxy, ethylidene diphosphonic acid (HEDP), 1-hydroxyethane-1,1-diphosphonic acid, hexamethylene diphosphonic acid, trimethylene diphosphonic acid, decamethylene diphosphonic acid, 1-hydroxy, propylidene diphosphonic acid, 1,6-dihydroxy, 1,6-dimethyl, hexamethylene diphosphonic acid, dihydroxy diethyl ethylene diphosphonic acid.

Compounds which can be considered exemplary for Formula 3 are as follows: nitrilo-tri(methylene phosphonic acid), imino-di(methylene phosphonic acid), n-butyl-amino-di(methyl phosphonic acid), decyl-amino-di(methyl phosphonic acid), trisodium-pentadecyl-amino-di-methyl phosphate, n-butyl-amino-di (ethyl phosphonic acid), tetrasodium-n-butyl-amino-di(methyl phosphate), triammonium tetradecyl-amino-di(methyl phosphate), phenyl-amino-di(methyl phosphonic acid), 4-hydroxy-phenyl-amino-di(methyl phosphonic acid), phenyl propyl amino-di (methyl phosphonic acid), tetrasodium phenyl ethyl amino-di(methyl phosphonic acid), ethylene diamine tetra(methyl phosphonic acid), trimethylene diamine tetra(methyl phosphonic acid), hepta methylene diamine tetra(methyl phosphonic acid), decamethylene diamine tetra(methyl phosphonic acid), tetradecamethylene diamine tetra(methyl phosphonic acid), ethylene diamine tri(methyl phosphonic acid), ethylene diamine di(methyl phosphonic acid), n-hexyl amine di(methyl phosphonic acid), diethylamine triamine penta(methyl phosphonic acid), ethanol amine di(methyl phosphonic acid), n-hexyl-amino(isopropylidene phosphonic acid)methyl-phosphonic acid, trihydroxy methyl, methyl amine di(methyl phosphonic acid), triethylene tetra amine hexa(methyl phosphonic acid), monoethanol, diethylene triamine tri(methyl phosphonic acid), chloroethylene amine di(methyl phosphonic acid).

The Preferred Phosphonates, Dosage and Feeding

The preferred phosphonates are the commercial products, Dequest 2000, amino-tri(methylene phosphonic acid) and its sodium salts, Dequest 2006, for example, which is hereafter referred to as "Treatment A". Another preferred phosphonate is Dequest 2010, 1-hydroxyethylidene-1,1-diphosphonic acid (HEDP). This compound is hereafter referred to as "Treatment B". As indicated, the phosphonates may be used in the free acid form or in the form of water soluble salts such as the alkali metal and ammonium salts. The phosphonates may be effective in treating the gypsum slurries at dosages of as little as 0.05 ppm based on the soluble gypsum contained in the irrigation water, expressed as millequivalents per liter. The dosage in most cases will be in the range between about 0.25 up to about 200 ppm. Typically, the dosage will be between 0.25–20 ppm with dosages ranging between 0.25–10 ppm giving satisfactory results. Dosage will also depend on the concentration of the gypsum in the slurry and the quality of the water used in the preparation of the slurry.

The phosphonates may be fed to the gypsum slurry using several options. Most often they will be added to slurries contained in a special gypsum dissolving apparatus such as is disclosed in U.S. Pat. No. 4,820,053. The phosphonates may be added at the time the slurry is prepared or after the slurry is prepared. It is even possible to add the phosphonates to the slurries when they are present in a drip irrigation distribution system just prior to the concentrated slurry being diluted to use concentrations. In this case, the phosphate would be injected directly into the irrigation water which would then be mixed with the concentrated gypsum slurry to provide use concentrations.

EXAMPLES

The invention is illustrated to its best advantage by the data appearing in Tables 1 and 2.

TABLE I

GYPSUM STABILITY IN WATER OF VARIOUS PURITY WITH AND WITHOUT TREATMENT A

| Gypsum Level (meg/liter) | Water[1] Impurity Level (ppm) | Treatment A Level (ppm active) | Turbidity[2] (NTU) |
|---|---|---|---|
| 12.22 | 400 | None | 126 |
| 12.22 | 400 | 1.75 | 5.1 |
| 8.15 | 400 | None | 107 |
| 8.15 | 400 | 1.25 | 0.6 |
| 6.11 | 400 | None | 98 |
| 6.11 | 400 | 1.00 | 0.6 |
| 4.07 | 400 | None | 68 |
| 4.07 | 400 | 0.75 | 0.7 |
| 3.06 | 400 | None | 51 |
| 3.06 | 400 | 0.50 | 0.6 |

TABLE I-continued

GYPSUM STABILITY IN WATER OF VARIOUS PURITY WITH AND WITHOUT TREATMENT A

| Gypsum Level (meg/liter) | Water[1] Impurity Level (ppm) | Treatment A Level (ppm active) | Turbidity[2] (NTU) |
|---|---|---|---|
| 30.95 | 200 | None | 39 |
| 30.95 | 200 | 0.75 | 0.6 |
| 12.22 | 200 | None | 38 |
| 12.22 | 200 | 1.75 | 0.7 |
| 12.22 | 200 | 0.75 | 0.7 |
| 3.06 | 200 | None | 29 |
| 3.06 | 200 | 0.50 | 0.6 |
| 30.95 | 100 | None | 22 |
| 30.95 | 100 | 0.50 | 0.8 |
| 12.22 | 100 | None | 22 |
| 12.22 | 100 | 1.75 | 0.6 |
| 12.22 | 100 | 0.50 | 0.6 |
| 3.06 | 100 | None | 21 |
| 3.06 | 100 | 0.50 | 0.7 |
| 30.95 | None[3] | None | 0.8 |
| 12.22 | None[3] | None | 0.6 |
| None[4] | None | None | 0.7 |

[1]Water contains alkalinity in terms of CaCO3.
[2]Turbidity in Nephelometric Turbidity Units (NTUs).
[3]Gypsum prepared in distilled water.
[4]Distilled water.

TABLE II

GYPSUM STABILITY IN WATER OF VARIOUS PURITY WITH AND WITHOUT TREATMENT B

| Gypsum Level (meg/liter) | Water[1] Impurity Level (ppm) | Treatment B Level (ppm active) | Turbidity[2] (NTU) |
|---|---|---|---|
| 12.22 | 400 | None | 126 |
| 12.22 | 400 | 2.00 | 11 |
| 8.15 | 400 | None | 107 |
| 8.15 | 400 | 1.50 | 0.8 |
| 6.11 | 400 | None | 98 |
| 6.11 | 400 | 1.25 | 0.8 |
| 4.07 | 400 | None | 68 |
| 4.07 | 400 | 1.00 | 0.9 |
| 3.06 | 400 | None | 51 |
| 3.06 | 400 | 0.75 | 0.7 |
| 30.95 | 200 | None | 39 |
| 30.95 | 200 | 1.00 | 0.7 |
| 12.22 | 200 | None | 38 |
| 12.22 | 200 | 2.00 | 0.8 |
| 12.22 | 200 | 1.00 | 0.8 |
| 3.06 | 200 | None | 29 |
| 3.06 | 200 | 0.75 | 0.9 |
| 30.95 | 100 | None | 22 |
| 30.95 | 100 | 0.75 | 0.9 |
| 12.22 | 100 | None | 22 |
| 12.22 | 100 | 2.00 | 0.7 |
| 12.22 | 100 | 0.75 | 0.8 |
| 3.06 | 100 | None | 21 |
| 3.06 | 100 | 0.75 | 0.7 |
| 30.95 | None[3] | None | 0.8 |
| 12.22 | None[3] | None | 0.6 |
| None[4] | None | None | 0.7 |

[1]Water contains alkalinity in terms of CaCO3.
[2]Turbidity in Nephelometric Turbidity Units (NTUs).
[3]Gypsum prepared in distilled water.
[4]Distilled water.

As demonstrated in Tables I and II, gypsum at typical injection rates of 3 to 31 meq/liter (saturation point of gypsum), with impure water, forms precipitates which have the potential to interfere with irrigation systems. This precipitate formation is determined by nephelometry, which is a measurement of particle formation in terms of turbidity. The inventive composition, at various rates of treatments, in varying levels of water impurity, prevents this precipitate formation, as shown in Table I. As seen in Tables I and II, very low levels of the inventive composition of gypsum and the phosphonates yield no particle formation, when compared to the impure waters containing gypsum with no treatment. The inventive composition of ultra-fine gypsum and phosphonates allows for the use of impure, naturally-occurring water for gypsum injection. This technology stabilizes the water-gypsum system, such that no plugging or clogging of the drip irrigation occurs under normal use conditions. This allows for many more opportunities to utilize the benefits of gypsum in soil remediation that were not practically possible with the prior art.

The inventive composition of ultra-fine gypsum and phosphonates maintains the gypsum as an ultra-fine colloidal system, even in highly impure waters. Since very low levels of the phosphonate are required, this system provides a cost effective means of injecting gypsum.

We claim:

1. In a process for feeding irrigation water containing gypsum to agricultural soils using drip irrigation systems where the water is obtained by mixing concentrated gypsum slurries containing between 0.01 to about 4 lbs. per gallons of finely divided gypsum having an average particle size smaller that 100 mesh with an irrigation water which contains precipitate forming impurities which irrigation waters when passed through the irrigation water conduits of drip irrigation systems causes these conduits to plug: the improvement comprising adding to the gypsum slurry a water soluble phosphonate scale inhibitor in a sufficient amount to prevent scaling in the irrigation water conduits.

2. The process of claim 1 where the water soluble phosphonate has the formula selected from the group consisting of:

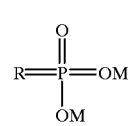

(1)

where R is lower alkyl having from about one to six carbon atoms, from the group consisting of, methyl, ethyl, butyl, propyl, isopropyl, pentyl, isopentyl and hexyl; substituted lower alkyl of from one to six carbon atoms, from the group consisting of, hydroxyl COOM and amino-substituted alkyls; a mononuclear aromatic aryl radical, from the group consisting of, phenyl, benzene or a substituted mononuclear aromatic compound, from the group consisting of, hydroxyl, COOM amino, lower alkyl substituted aromatic, from the group consisting of, benzyl phosphonic acid; and M is a water-soluble cation, from the group consisting of, sodium, potassium, ammonium, lithium, or hydrogen,

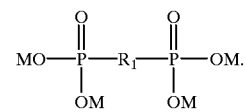

(2)

where $R_1$, is an alkylene having from about 1 to about 12 carbon atoms or a substituted alkylene having from about 1 to about 12 carbon atoms, from the group consisting of, hydroxyl, amino, substituted alkylenes; M is a water-soluble cation, from the group consisting of, sodium, potassium, ammonium, lithium, or hydrogen,

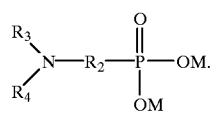  (3)

where $R_2$, is a lower alklene having from about one to about four carbon atoms, or an amine or hydroxy substituted lower alkylene; $R_3$, is from the group consisting of $[R_2$—$PO_3M_2,]$ H,OH, amino, substituted amino, alkyl radicals having from one to six carbon atoms, substituted alkyl radicals of from one to six carbon atoms a mononuclear aromatic radical and a substituted mononuclear aromatic radical; $R_4$, is $R_3$, or the group represented by the formula:

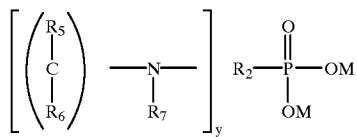

where $R_5$, and $R_6$, are from the group consisting of hydrogen, lower alkyl of from about one to six carbon atoms, a substituted lower alkyl radical; hydrogen, hydroxyl, amino group, substituted amino group; a mononuclear aromatic radical, and a substituted mononuclear aromatic radical $R_7$, is H, or lower alkyl e.g. about one to six carbon atoms, R is $R_5$, $R_6$, or the group $[R_2$—$PO_3M_2]$; n is a number of from 1 through about 15; y is a number of from about 1 through about 14; and M is a water-soluble cation, from the group consisting of, sodium, potassium, ammonium, lithium, or hydrogen.

3. The process of claim 2 where the phosphonate is from the group consisting of: amino-tri(methylene phosphonic acid), its sodium salts and 1-hydroxyethylidene-1,1-diphosphonic acid (HEDP), and its sodium salts.

4. The process of claim 3 where the phosphonate is amino-tri(methylene phosphonic acid).

5. The process of claim 3 where the phosphonate is: a sodium salt of amino-tri(methylene phosphonic acid).

6. The process of claim 3 where the phosphonate is: 1-hydroxyethylidene-1,1-diphosphonic acid (HEDP).

7. The process of claim 3 where the phosphate is: a sodium salt of 1-hydroxyethylidene-1,1-diphosphonic acid (HEDP).

* * * * *